Jan. 11, 1949.                    C. K. STEINS                    2,459,099
                              BEARING SHUNT MEANS
                              Filed Oct. 13, 1945
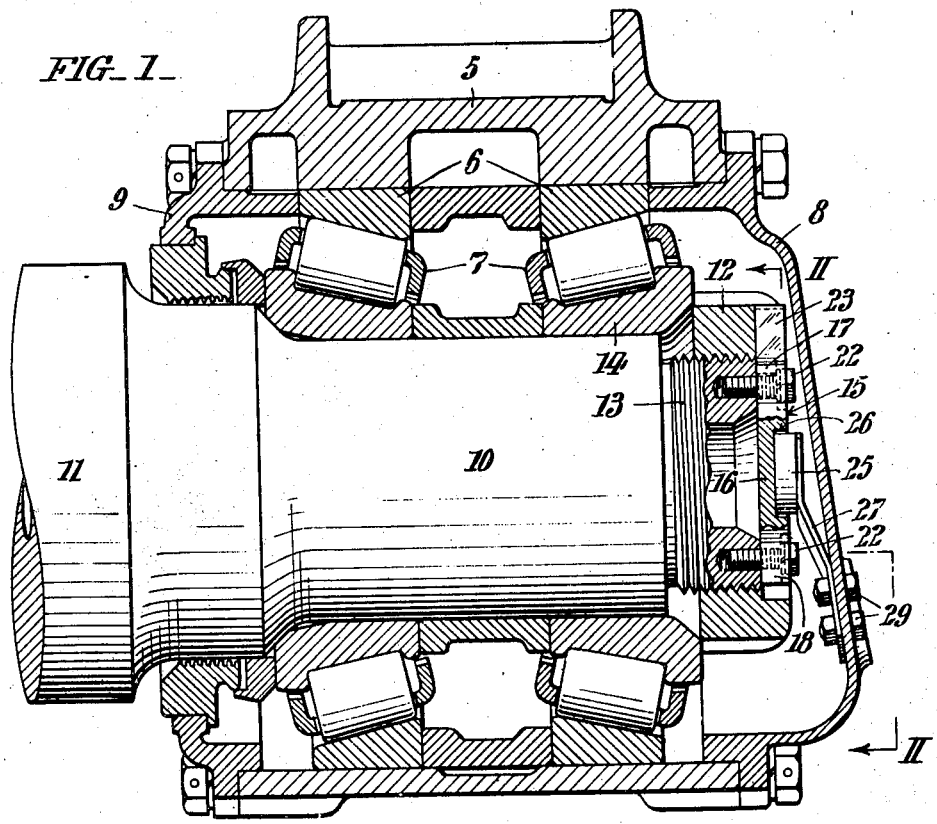
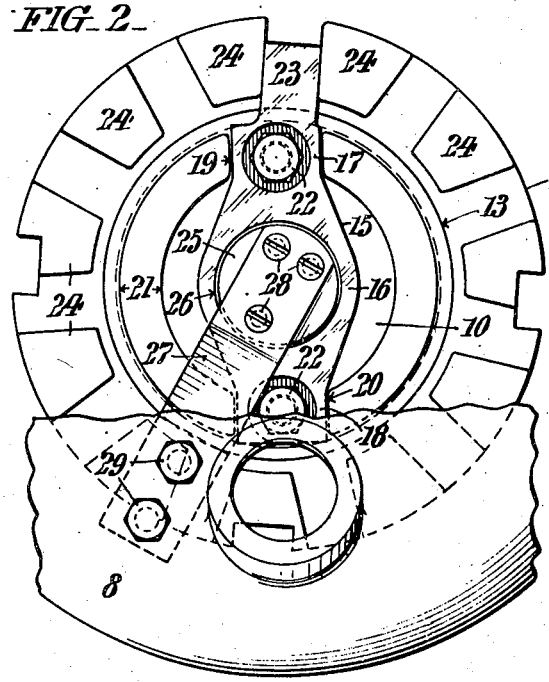
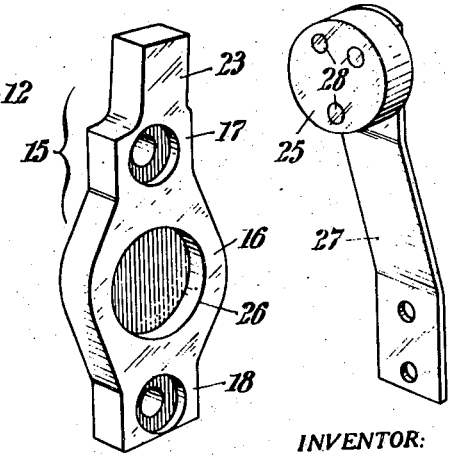
INVENTOR:
Carleton K. Steins,
BY Paul & Paul
ATTORNEYS.

Patented Jan. 11, 1949

2,459,099

UNITED STATES PATENT OFFICE 2,459,099

BEARING SHUNT MEANS

Carleton K. Steins, Merion, Pa., assignor to The Pennsylvania Railroad Company, Philadelphia, Pa., a corporation of Pennsylvania Application October 13, 1945, Serial No. 622,201

3 Claims. (Cl. 308—1)

This invention relates to bearing shunt means useful in connection with wheel axle journal boxes of electric locomotives or electrically powered railway cars and the like.

In the operation of electric railways wherein the rails are employed for current return it has been found that the wheel axle journals of locomotives or cars are subject to deterioration by passage of the current through the bearings. This is particularly true in journals mounted in anti-friction bearings of which the balls or rollers become pitted with resultant decrease in the life and efficiency of the bearings.

My invention is in the main directed toward overcoming the drawback referred to which desideratum is made possible of attainment through provision of a relatively simple and inexpensive shunt means such as hereinafter disclosed, which can be readily applied to existent journal box assemblies at small expense without requiring any structural alterations in them or changing in their normal mode of operation, and through the medium of which the electric current is prevented from passing through the bearings en route through the wheels to the rails.

Other objects and attendant advantages will appear from the following detailed description of the attached drawings, wherein Fig. 1 is a fragmentary view in longitudinal section of a typical car wheel axle journal box assembly such as is commonly used on electric locomotives or on electric railroad cars equipped with my improved bearing shunt means.

Fig. 2 is a fragmentary broken out view on a slightly larger scale looking as indicated by the angled arrows II—II in Fig. 1.

Figs. 3 and 4 are perspective views of the component contact elements embodied in the shunt means.

With more detailed reference first more particularly to Figs. 1 and 2 of these illustrations, 5 indicates the journal box proper which is bored to receive the outer race rings 6 of an anti-friction bearing 7, said rings being held in place by removable outer and inner end wall members or covers 8 and 9 of the box. The inner or end wall member or cover 9 has a central opening for passage of the journal 10 of the wheel axle 11; and the retaining nut at 12 threadedly engages the diametrically-reduced screw end 13 of said journal to prevent displacement of the inner race ring 14 of the bearing.

The shunt means which I have devised to prevent passage of electric current through the anti-friction bearing of a typical car wheel axle journal assembly as briefly described above includes a contact element 15 which is separately illustrated in perspective in Fig. 3. As shown this contact element 15 is in the form of a key having a substantially circular mid portion 16 and diametral arms 17 and 18 which fit into correspondingly disposed notches 19 and 20 at the hollow end of the axle journal 10, said arms being apertured for passage of the threaded shanks of headed securing bolts 22 into the journal end. As shown, the arm 17 has a prolongation 23 capable of selective engagement between pairs of spaced circumferential lugs 24 on the retaining nut 12 incident to adjustment of the latter. My improved shunt means further includes a complemental contact element in the form of a relatively thick disk 25 which is separately illustrated in Fig. 4 and which is adapted to frictionally engage the bottom of a circular recess 26 in the mid portion of the element 15 concentric with the axis of the journal. For the purpose of maintaining the disk 25 in pressure engagement with the element 15, I rely upon a leaf spring 27 to the free end of which said disk is rigidly affixed by a plurality of cap screws 28, the other end of said spring being secured to the outer cover or end wall member 8 of the journal box by two anchoring screw bolts 29. In practice the element 15 is preferably fashioned from hardened steel and its recess 26 smoothly finished, and the complemental element 25 from relatively soft bearing metal to insure good electric contact with absence of sparking.

From the foregoing it will be seen that I have provided a simple and effective bearing shunt means which can be readily applied to existent standardized car axle journal boxes without requiring any changes in them and without entailing large expense from the standpoint of labor costs in assembling.

Having thus described my invention, I claim:

1. Bearing shunt means for use in connection with a wheel axle journal box of an electric locomotive or an electrically powered railway car, comprising a contact element with means for securing it to the end of the axle journal and having in its outer face a recess coaxial with said journal; a complemental cooperative contact element occupying the recess in the first contact element and frictionally bearing on the bottom of the same; and a leaf spring with one end thereof fixedly secured to a removable cover of the journal box and with its other end supporting the complemental contact element to maintain it in pressure contact with the bottom of the recess in said first contact element.

2. Bearing shunt means for use in connection with a wheel axle journal box of an electric locomotive or an electrically-powered railway car, wherein the inner race of an anti-friction bearing is held in place by a retaining nut threadedly engaged upon the journal, said shunt means including a contact element in the form of a diametral bar engaged and removably secured within a diametral recess in the end of the journal, said element having one end extending into a radial notch in the nut to lock the latter against rotation; a complemental cooperative contact element; and yielding means for maintaining the cooperative contact element in frictional engagement with the first mentioned contact element.

3. Bearing shunt means according to claim 2, wherein the cooperative complemental contact comprises a disk which engages within an axial recess in the first mentioned contact element; and wherein the yielding means is in the form of a leaf spring anchored on a wall of the journal box and to the free end of which the cooperative contact element is secured.

CARLETON K. STEINS.

REFERENCES CITED

The following references are of record in the file of this patent:

UNITED STATES PATENTS

| Number | Name | Date |
| --- | --- | --- |
| 1,493,416 | Angstrom | May 6, 1924 |